(12) United States Patent
Park et al.

(10) Patent No.: US 8,941,972 B2
(45) Date of Patent: Jan. 27, 2015

(54) MULTILAYER CERAMIC ELECTRONIC COMPONENT

(75) Inventors: Myung Jun Park, Chungcheongbuk-do (KR); Sang Hoon Kwon, Gyunggi-do (KR); Chang Hoon Kim, Gyunggi-do (KR); Hyun Hee Gu, Gyunggi-do (KR); Jae Young Park, Seoul (KR); Da Young Choi, Gyunggi-do (KR); Kyu Ha Lee, Gyunggi-do (KR); Byung Jun Jeon, Seoul (KR)

(73) Assignee: Samsung Electro-Mechanics Co., Ltd., Suwon, Gyunggi-Do (KR)

( * ) Notice: Subject to any disclaimer, the term of this patent is extended or adjusted under 35 U.S.C. 154(b) by 225 days.

(21) Appl. No.: 13/572,407

(22) Filed: Aug. 10, 2012

(65) Prior Publication Data
US 2013/0120898 A1   May 16, 2013

(30) Foreign Application Priority Data

Nov. 11, 2011 (KR) .................. 10-2011-0117398

(51) Int. Cl.
  *H01G 4/30* (2006.01)
  *H01B 3/12* (2006.01)
  *H01G 4/12* (2006.01)
  *H01G 4/232* (2006.01)

(52) U.S. Cl.
  CPC .. *H01B 3/12* (2013.01); *H01G 4/30* (2013.01); *H01G 4/12* (2013.01); *H01G 4/2325* (2013.01)
  USPC .................. 361/301.4; 361/301.2; 361/306.1; 361/306.2; 361/321.1; 361/321.2

(58) Field of Classification Search
  CPC ......... H01G 4/30; H01G 4/005; H01G 4/228; H01G 4/232; H01G 4/12; H01G 4/06
  USPC .......... 361/301.4, 301.2, 306.1, 306.3, 321.1, 361/321.2, 311–313
  See application file for complete search history.

(56) References Cited

U.S. PATENT DOCUMENTS 7,589,954 B2 *  9/2009  Kusano et al. ............. 361/321.4
2009/0190285 A1   7/2009  Kusano et al.

FOREIGN PATENT DOCUMENTS

| JP | 8-97072 A | 4/1996 |
|---|---|---|
| JP | 2001-274035 A | 10/2001 |
| JP | 2004-128328 A | 4/2004 |
| JP | 2012-009556 A | 1/2012 |
| KR | 10-2009-0042850 A | 4/2009 |

OTHER PUBLICATIONS

Japanese Office Action issued in Japanese Application No. 2012-164492 dated May 20, 2014, w/English translation.

* cited by examiner

*Primary Examiner* — Nguyen T Ha
(74) *Attorney, Agent, or Firm* — McDermott, Will & Emery

(57) ABSTRACT

There are provided a multilayer ceramic electronic component and a method of manufacturing the same. The multilayer ceramic electronic component includes: a ceramic body including a dielectric layer; first and second internal electrodes disposed within the ceramic body to face each other, while having the dielectric layer interposed therebetween; and first external electrodes electrically connected to first and second internal electrodes and second external electrodes formed on the first external electrodes, wherein the first and second external electrodes include a conductive metal and a glass, and when the second external electrodes are divided into three equal parts in a thickness direction, an area of the glass in central parts thereof with respect to an area of the central parts is 30 to 80%. Therefore, sealing properties of a chip is improved, whereby a multilayer ceramic electronic component having improved reliability may be implemented.

24 Claims, 4 Drawing Sheets

MULTILAYER CERAMIC ELECTRONIC COMPONENT

CROSS-REFERENCE TO RELATED APPLICATIONS

This application claims the priority of Korean Patent Application No. 10-2011-0117398 filed on Nov. 11, 2011, in the Korean Intellectual Property Office, the disclosure of which is incorporated herein by reference.

BACKGROUND OF THE INVENTION

1. Field of the Invention

The present invention relates to a multilayer ceramic electronic component having improved reliability by improving sealing properties of a chip.

2. Description of the Related Art

In accordance with the recent trend for the miniaturization of electronic products, demand for multilayer ceramic electronic components having a small size and high capacitance has increased.

In accordance with the demand for multilayer ceramic electronic components having a small size and high capacitance, an external electrode of the multilayer ceramic electronic component has also been thinned.

An external electrode paste may include a conductive metal such as copper (Cu) as a main material to thereby ensure chip sealing properties and electrical conductivity between the external electrode and a chip and include glass as an auxiliary material to thereby serve to provide adhesion between the external electrode and the chip simultaneously with filling voids during sintering shrinkage of a metal.

However, in the case in which a content of glass in the external electrode paste is insufficient, chip sealing properties may be defective. In the case an excessive amount of glass is added to the external electrode paste in order to complement the chip sealing properties, a defect such as a plating defect may occur due to the elution of the glass to a surface.

Particularly, in accordance with the thinning of the external electrode, it is difficult to implement a desired level of density, and the possibility that a defect will occur due to a deficiency or excess of glass, owing to high temperature behavior characteristics of the glass, may be increased.

In addition, in a small-sized multilayer ceramic electronic component in which a coating thickness of the external electrode is thin, a thickness of the external electrode at a corner portion maybe especially thin, such that corner coverage performance is low. Therefore, a plating solution may infiltrate into a ceramic body.

SUMMARY OF THE INVENTION

An aspect of the present invention provides a multilayer ceramic electronic component having improved reliability by improving sealing properties of a chip.

According to an aspect of the present invention, there is provided a multilayer ceramic electronic component including: a ceramic body including a dielectric layer; first and second internal electrodes disposed within the ceramic body to face each other, while having the dielectric layer interposed therebetween; and first external electrodes electrically connected to first and second internal electrodes and second external electrodes formed on the first external electrodes, wherein the first and second external electrodes include a conductive metal and a glass, and when the second external electrodes are divided into three equal parts in a thickness direction, an area of the glass in central parts thereof with respect to an area of the central parts is 30 to 80%.

A ratio of a content of the glass in the first external electrodes to a content of the glass in the second external electrodes may be 0.5 or less.

A ratio of an area of the glass in the first external electrodes to an area of the glass in the second external electrodes may be 0.5 or less.

The second external electrodes may have an average thickness of 5 μm or more, and the glass included in the second external electrodes may be an insulating glass.

The conductive metal may be at least one selected from a group consisting of copper (Cu), nickel (Ni), silver (Ag), and sliver-palladium (Ag—Pd).

According to another aspect of the present invention, there is provided a multilayer ceramic electronic component including: a ceramic body including a dielectric layer; first and second internal electrodes disposed within the ceramic body to face each other, while having the dielectric layer interposed therebetween; and first external electrodes electrically connected to first and second internal electrodes and second external electrodes formed on the first external electrodes, wherein the first and second external electrodes include a conductive metal and a glass, and the second external electrodes contain 35 to 200 parts by weight of the glass with respect to 100 parts by weight of the conductive metal.

A ratio of a content of the glass in the first external electrodes to a content of the glass in the second external electrodes may be 0.5 or less.

A ratio of an area of the glass in the first external electrodes to an area of the glass in the second external electrodes may be 0.5 or less.

The second external electrodes may have an average thickness of 5 μm or more, and the glass included in the second external electrodes may be an insulating glass.

The conductive metal may be at least one selected from a group consisting of copper (Cu), nickel (Ni), silver (Ag), and sliver-palladium (Ag—Pd).

When the second external electrodes are divided into three equal parts in a thickness direction, an area of the glass in central parts thereof with respect to an area of the central parts may be 30 to 80%.

According to another aspect of the present invention, there is provided a conductive paste for an external electrode, the conductive paste including: a conductive metal; and a glass, wherein the glass has a content of 35 to 200 parts by weight with respect to 100 parts by weight of the conductive metal.

The glass may be an insulating glass.

The conductive metal may be at least one selected from a group consisting of copper (Cu), nickel (Ni), silver (Ag), and sliver-palladium (Ag—Pd).

According to another aspect of the present invention, there is provided a method of manufacturing a multilayer ceramic component, the method including: preparing a ceramic body including a dielectric layer and first and second internal electrodes disposed to face each other, while having the dielectric layer interposed therebetween; forming first external electrodes on end surfaces of the ceramic body so as to be electrically connected to the first and second internal electrodes; preparing a conductive paste for an external electrode including a conductive metal and a glass having a content of 35 to 200 parts by weight with respect to 100 parts by weight of the conductive metal; applying the conductive paste for an external electrode onto the first external electrodes; and forming second external electrodes on the first external electrodes by sintering the ceramic body.

When the second external electrodes are divided into three equal parts in a thickness direction, an area of the glass in central parts thereof with respect to an area of the central parts may be 30 to 80%.

A ratio of a content of the glass in the first external electrodes to a content of the glass in the second external electrodes may be 0.5 or less.

A ratio of an area of the glass in the first external electrodes to an area of the glass in the second external electrodes may be 0.5 or less.

The second external electrodes may have an average thickness of 5 μm or more, and the glass included in the second external electrodes may be an insulating glass.

The conductive metal may be at least one selected from a group consisting of copper (Cu), nickel (Ni), silver (Ag), and sliver-palladium (Ag—Pd).

The sintering of the ceramic body may be performed at a temperature of 750° C. or less.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
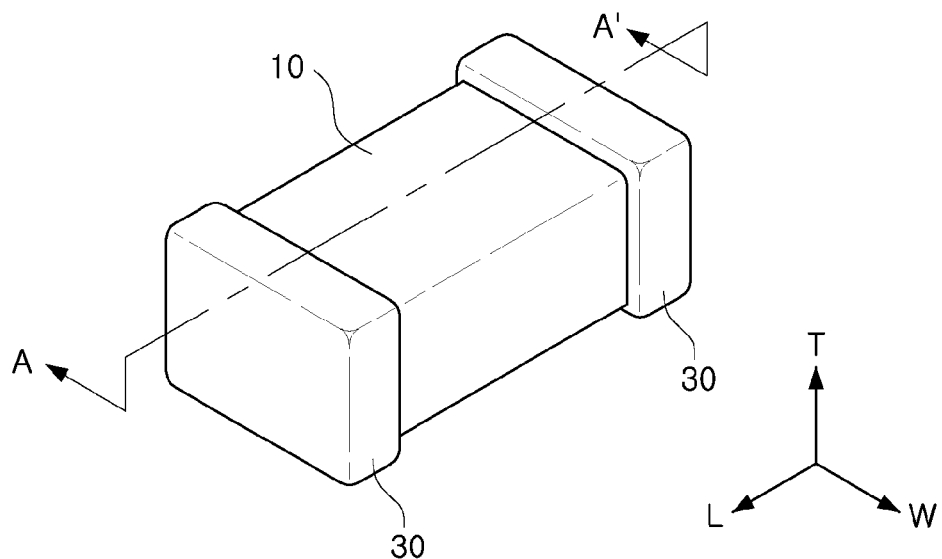
FIG. 1 is a perspective view schematically showing a multilayer ceramic capacitor according to an embodiment of the present invention.

Embodiments of the present invention may be modified in many different forms and the scope of the invention should not be limited to the embodiments set forth herein. Rather, these embodiments are provided so that this disclosure will be thorough and complete, and will fully convey the concept of the invention to those skilled in the art. In the drawings, the shapes and dimensions may be exaggerated for clarity, and the same reference numerals will be used throughout to designate the same or like components.

Embodiments of the present invention will now be described in detail with reference to the accompanying drawings.

FIG. 1 is a perspective view schematically showing a multilayer ceramic capacitor according to an embodiment of the present invention.

Figure 2:
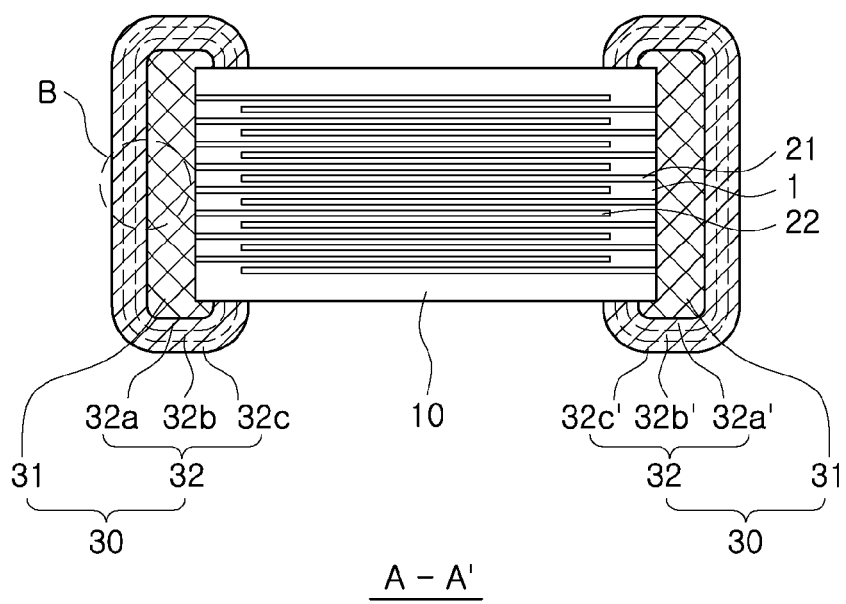
FIG. 2 is a cross-sectional view of line A-A' of FIG. 1.

FIG. 2 is a cross-sectional view of line A-A' of FIG. 1.

Figure 3:
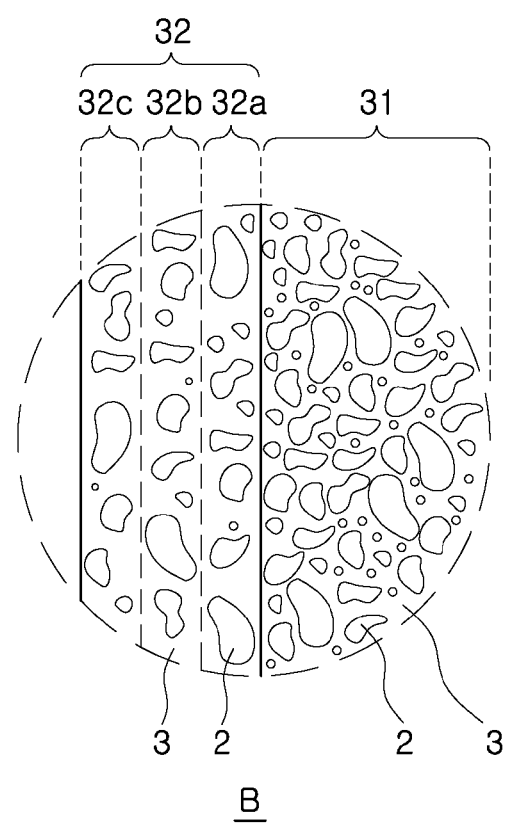
FIG. 3 is an enlarged view of part B of FIG. 2.

FIG. 3 is an enlarged view of part B of FIG. 2.

Referring to FIGS. 1 to 3, the multilayer ceramic electronic component according to the embodiment of the present invention may include a ceramic body 10 including a dielectric layer 1; first and second internal electrodes 21 and 22 disposed within the ceramic body 10 to face each other while having the dielectric layer 1 interposed therebetween; and first external electrodes 31 electrically connected to the first and second internal electrodes 21 and 22 and second external electrodes 32 formed on the first external electrodes, wherein the first and second external electrodes 31 and 32 include a conductive metal 2 and a glass 3, and when the second external electrodes 32 are divided into three equal parts in a thickness direction, an area of the glass 3 in central parts 32$b$ and 32$b'$ thereof with respect to an area of the central parts 32$b$ and 32$b'$ is 30 to 80%.

A ratio of a content of the glass in the first external electrodes to a content of the glass in the second external electrodes may be 0.5 or less.

A ratio of an area of the glass in the first external electrodes to an area of the glass in the second external electrodes may be 0.5 or less.

The second external electrodes may have an average thickness of 5 μm or more, and the glass included in the second external electrodes may be an insulating glass.

The conductive metal may be at least one selected from a group consisting of copper (Cu), nickel (Ni), silver (Ag), and sliver-palladium (Ag—Pd).

Hereinafter, the multilayer ceramic electronic component according to the embodiment of the present invention will be described. Particularly, a multilayer ceramic capacitor will be described. However, the present invention is not limited thereto.

In the multilayer ceramic capacitor according to the embodiment of the present invention, a 'length direction' refers to an 'L' direction of FIG. 1, a 'width direction' refers to a 'W' direction of FIG. 1, and a 'thickness direction' refers to a 'T' direction of FIG. 1. Here, the 'thickness direction' has the same concept as a direction in which dielectric layers are laminated, that is, a 'lamination direction'.

According to the embodiment of the present invention, a raw material forming the dielectric layer 1 is not particularly limited as long as sufficient capacitance may be obtained, but may be, for example, a barium titanate ($BaTiO_3$) powder.

A material forming the dielectric layer 1 may be made by adding various ceramic additives, organic solvents, plasticizers, binders, dispersing agents or the like to powder such as a barium titanate ($BaTiO_3$) powder, or the like, according to the intended purpose of the present invention.

A material forming the first and second internal electrodes 21 and 22 is not particularly limited, but may be a conductive paste made of at least one of, for example, silver (Ag), lead (Pg), platinum (Pt), nickel (Ni), and copper (Cu).

The multilayer ceramic capacitor according to the embodiment of the present invention may include the first external electrodes 31 electrically connected to the first and second internal electrodes 21 and 22.

The first external electrodes 31 may be electrically connected to the first and second internal electrodes 21 and 22 in order to form capacitance.

The first external electrodes 31 may include, for example, the conductive metal 2 and the glass 3, but is not particularly limited.

In addition, the multilayer ceramic capacitor may include the second external electrodes 32 formed on the first external electrodes, and the second external electrodes 32 may include the conductive metal 2 and the glass 3, but are not limited thereto.

When the second external electrodes 32 are divided into three equal parts in the thickness direction, the second external electrodes 32 maybe divided into three parts 32$a$, 32$b$, and 32$c$, and 32$a'$, 32$b'$, and 32$c'$, and an area of the glass 3 in the central parts 32$b$ and 32$b'$ thereof with respect to an area of the central parts 32$b$ and 32$b'$ may be 30 to 80%.

A measurement position of the area of the glass 3 is not particularly limited, but may be the central parts 32$b$ and 32$b'$ when the second external electrodes 32 are divided into three equal parts in the thickness direction.

Here, a thickness of the second external electrodes means a height at which the second external electrodes are formed on both end surfaces of the multilayer ceramic capacitor in the length direction and a height at which the second external electrodes are formed on upper and lower surfaces of the multilayer ceramic capacitor in the thickness direction.

A method of measuring the area of the glass 3 is not particularly limited. For example, the area of the glass 3 may be measured as a ratio of the area of the glass in the central parts 32b and 32b' to an area of 150 μm×10 μm (width× length) in the central parts 32b and 32b'.

For example, when the second external electrodes 32 are divided into three equal parts in the thickness direction, the area of the glass 3 in the central parts 32b and 32b' with respect to the area of the central parts 32b and 32b' may be measured from an image obtained by scanning a cross section of the multilayer ceramic capacitor in the length direction using a scanning electron microscope (SEM) as shown in FIG. 2.

More specifically, the area of the glass 3 with respect to an area of the cross section of the external electrodes in an external electrode area extracted from the image obtained by scanning a cross section of the multilayer ceramic capacitor in a length and thickness (L-T) direction taken along a central portion of the multilayer ceramic capacitor in the width (W) direction using the scanning electron microscope (SEM) as shown in FIG. 2 may be measured.

According to the embodiment of the present invention, as described above, the second external electrodes 32 including a larger amount of the glass 3 than that of the first external electrodes 31 are formed on the first external electrodes 31 to increase density of the external electrodes, whereby infiltration of a plating solution into the ceramic body may be prevented.

In addition, at the same time, a sintering temperature of the external electrodes is lowered to suppress sintering of the conductive metal, whereby a defect that plating is not performed due to an excessive content of glass maybe prevented.

In the case in which the area of the glass 3 in the central parts 32b and 32b' with respect to the area of the central parts 32b and 32b' is less than 30%, density of the external electrodes may not be increased due to a small content of glass, such that a defect that the plating solution infiltrates into the ceramic body may occur.

On the other hand, in the case in which the area of the glass 3 in the central parts 32b and 32b' with respect to the area of the central parts 32b and 32b' exceeds 80%, a defect that plating is not performed due to the elution of glass may occur, owing to an excessive content of glass.

More specifically, according to the embodiment of the present invention, a ratio of an area of the glass in the first external electrodes 31 to an area of the glass in the second external electrodes 32 is not particularly limited, but may be 0.5 or less.

When the ratio of the area of the glass in the first external electrodes 31 to the area of the glass in the second external electrodes 32 exceeds 0.5, a difference between the contents of glass included in the first and second external electrodes is not significant, such that the density of the external electrodes may not be increased and the defect that the plating is not performed may not be prevented.

The second external electrodes 32 are not particularly limited, but may have an average thickness of 5 μm or more. In the case in which the average thickness of the second external electrodes is less than 5 μm, the plating solution may infiltrate into the ceramic body to cause a defect.

The glass 3 included in the second external electrodes is not particularly limited, but may be, for example, an insulating glass.

The conductive metal 2 is not particularly limited, but may be, for example, at least one selected from a group consisting of copper (Cu), nickel (Ni), silver (Ag), and sliver-palladium (Ag—Pd).

A multilayer ceramic electronic component according to another embodiment of the present invention may include the ceramic body 10 including the dielectric layer 1; the first and second internal electrodes 21 and 22 disposed within the ceramic body 10 to face each other while having the dielectric layer 1 interposed therebetween; and the first external electrodes 31 electrically connected to the first and second internal electrodes 21 and 22 and the second external electrodes 32 formed on the first external electrodes 31, wherein the first and second external electrodes 31 and 32 include a conductive metal and a glass, and the second external electrodes 32 may include 35 to 200 parts by weight of the glass with respect to 100 parts by weight of the conductive metal.

The multilayer ceramic electronic component according to the embodiment of the present invention will be described in detail below. However, a description overlapped with the description of the multilayer ceramic electronic component according to the above-mentioned embodiment of the present invention will be omitted.

More specifically, according to the embodiment of the present invention, the second external electrodes 32 may include the conductive metal and the glass having a content of 35 to 200 parts by weight with respect to 100 parts by weight of the conductive metal.

The conductive metal is not particularly limited, but may be, for example, at least one selected from a group consisting of copper (Cu), nickel (Ni), silver (Ag), and sliver-palladium (Ag—Pd).

The second external electrodes 32 include the glass having a content of 35 to 200 parts by weight with respect to 100 parts by weight of the conductive metal, such that the ceramic body 10 may have excellent sealing properties even in the case in which a content of glass is significantly increased and thus the external electrode is thin.

More specifically, the glass may improve sintering of the conductive metal, perform as an adhesive between the ceramic body 10 and the external electrode and allow for the implementation of chip sealing properties.

According to the embodiment of the present invention, since the content of glass included in the second external electrodes 32 is significantly increased, the ceramic body 10 may have significantly excellent sealing properties.

Therefore, in the multilayer ceramic capacitor according to the embodiment of the present invention, high temperature insulation resistance (IR) characteristics are improved, such that reliability may be excellent.

According to the related art, in accordance with a reduction in the thickness of the external electrode, a thickness of a corner portion of the external electrode is reduced, such that the density of the external electrode is low to cause the plating solution to infiltrate into the ceramic body.

However, according to the embodiment of the present invention, even in the case in which the thickness of the corner portion of the external electrode is reduced, the density of the corner portion increases due to an increase in the content of glass, whereby deterioration of reliability due to the infiltration of the plating solution may be prevented.

In the case in which the content of glass is less than 35 parts by weight with respect to 100 parts by weight of the conductive metal, the content of glass is small, such that the sealing properties of the ceramic body according to the intended purpose of the present invention may not be obtained.

In addition, in the case in which the content of glass exceeds 200 parts by weight with respect to 100 parts by weight of the conductive metal, the content of glass is excessively large, such that the defect that the plating is not performed due to the elution of the glass may occur.

Referring to FIG. 2, when the second external electrodes 32 are divided into three equal parts in the thickness direction, the area of the glass 3 in the central parts 32b and 32b' with respect to the area of the central parts 32b and 32b' may be 30 to 80%.

According to the embodiment of the present invention, since the second external electrodes 32 include an increased content of glass, the area of the glass in the second external electrodes 32 with respect to the area of the second external electrodes 32 may be 30 to 80%.

A conductive paste for an external electrode according to another embodiment of the present invention may include the conductive metal 2 and the glass 3, and the glass 3 may have a content of 35 to 200 parts by weight with respect to 100 parts by weight of the conductive metal 2.

In the multilayer ceramic capacitor according to the embodiment of the present invention, the second external electrodes 32 may be formed of the conductive paste for an external electrode.

In the conductive paste for an external electrode, since the glass 3 may have the content of 35 to 200 parts by weight with respect to 100 parts by weight of the conductive metal 2, the ceramic body 10 may have excellent sealing properties.

In addition, at the same time, a sintering temperature of the external electrode is lowered to suppress sintering of the conductive metal, whereby a defect that plating is not performed due to an excessive content of glass maybe prevented.

Figure 4:
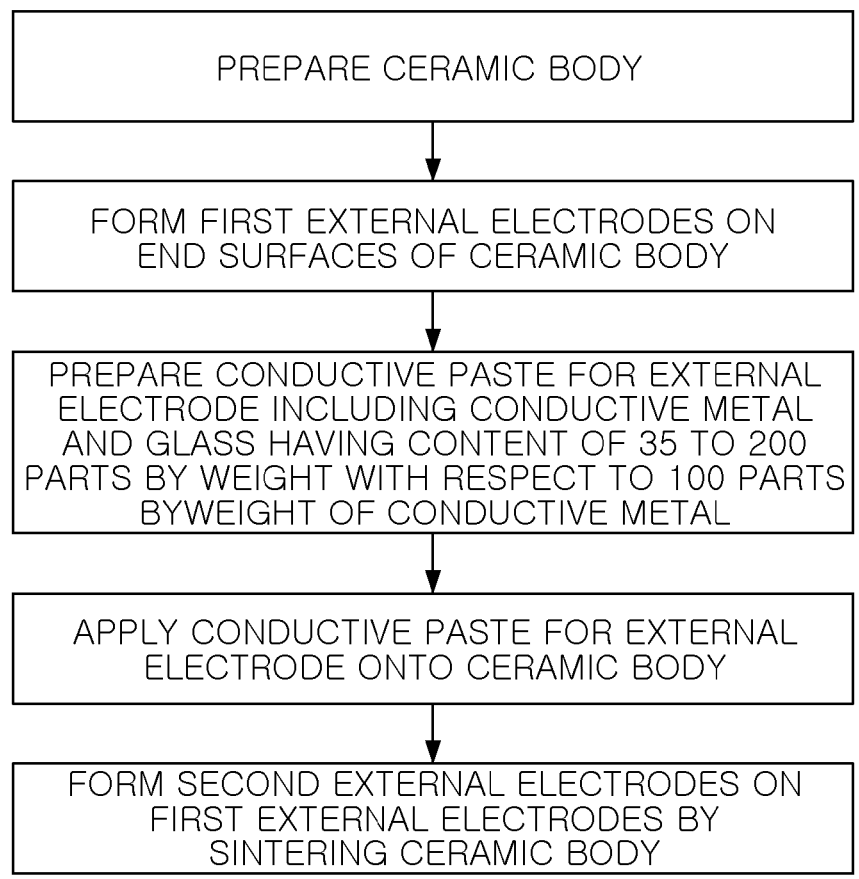
FIG. 4 is a flow chart showing a process of manufacturing a multilayer ceramic capacitor according to another embodiment of the present invention.

FIG. 4 is a flowchart showing a process of manufacturing a multilayer ceramic capacitor according to another embodiment of the present invention.

Referring to FIG. 4, a method of manufacturing a multilayer ceramic component according to another embodiment of the present invention may include: preparing the ceramic body 10 including the dielectric layer 1 and first and second internal electrodes 21 and 22 disposed to face each other while having the dielectric layer 1 interposed therebetween; forming the first external electrodes 31 on end surfaces of the ceramic body 10 so as to be electrically connected to the first and second internal electrodes 21 and 22; preparing a conductive paste for an external electrode, including the conductive metal 2 and the glass 3 having a content of 35 to 200 parts by weight with respect to 100 parts by weight of the conductive metal 2; applying the conductive paste for an external electrode onto the first external electrodes 31; and forming second external electrodes 32 on the first external electrodes 31 by sintering the ceramic body.

In the method of manufacturing a multilayer ceramic component according to another embodiment of the present invention, a description overlapped with the description of the multilayer ceramic electronic component according to the above-mentioned embodiment of the present invention will be omitted.

Hereinafter, the method of manufacturing a multilayer ceramic electronic component according to another embodiment of the present invention will be described in detail. Particularly, a multilayer ceramic capacitor will be described. However, the present invention is not limited thereto.

First, the ceramic body 10 including the dielectric layer 1 and the first and second internal electrodes 21 and 22 disposed to face each other while having the dielectric layer 1 interposed therebetween, may be prepared.

The dielectric layer 1 may be formed of a ceramic green sheet, which is prepared to have a thickness of several µm. The ceramic green sheet is prepared by applying a slurry formed by mixing powder such as a barium titanate ($BaTiO_3$) powder or the like with a ceramic additive, an organic solvent, a plasticizer, a binder, and a dispersing agent onto a carrier film through a use of a basket mill and then drying the applied slurry.

Then, the internal electrode layers may be formed by dispensing the conductive paste on the ceramic green sheet and moving a squeegee in one direction.

Here, the conductive paste may be formed of at least one of a noble metal such as silver (Ag), lead (Pb), platinum (Pt), or the like, nickel (Ni), copper (Cu) or a combination of at least two thereof.

After the internal electrode layers are formed as described above, the ceramic green sheet is separated from the carrier film and then a plurality layers of the ceramic green sheet are overlapped and laminated to form a ceramic green sheet laminate. Then, the ceramic green sheet laminate may be compressed at a high temperature and pressure condition and then cut to have a predetermined size through a cutting process, whereby the ceramic body is prepared.

Next, the first external electrodes 31 may be formed on the end surfaces of the ceramic body 10 so as to be electrically connected to the first and second internal electrodes 21 and 22.

Thereafter, the conductive paste for an external electrode including the conductive metal 2 and the glass 3 having a content of 35 to 200 parts by weight with respect to 100 parts by weight of the conductive metal 2 may be prepared.

The conductive metal 2 maybe at least one selected from a group consisting of copper (Cu), nickel (Ni), silver (Ag), and sliver-palladium (Ag—Pd).

Next, the conductive paste for an external electrode may be applied to the first external electrodes 31.

Finally, the second external electrodes 32 maybe formed on the first external electrodes 31 by sintering the ceramic body 10.

An operation of the sintering the ceramic body 10 may be performed at a temperature of 750° C. or less.

According to the embodiment of the present invention, even in the case in which the second external electrodes 32 include an increased content of glass, the ceramic body 10 may be sintered at a low temperature of 750° C. or less in order to prevent a defect that plating is not performed due to the elution of the glass.

Hereafter, although the present invention will be described in detail with reference to Comparative Examples and Inventive Examples, it is not limited thereto.

Electrode connectivity, a plating defect, a chip adhesion defect, and reliability were tested with respect to multilayer ceramic capacitors according to Inventive Examples, including first external electrodes including a conductive metal and a glass and second external electrodes formed on the first external electrodes and including the conductive metal and the glass having a content of 35 to 200 parts by weight with respect to 100 parts by weight of the conductive metal.

The multilayer ceramic capacitors according to the embodiment were manufactured as follows.

First, a slurry containing powder such as a barium titanate ($BaTiO_3$) powder, or the like, was applied and dried onto a carrier film to prepare a plurality of ceramic green sheets as dielectric layers.

Next, a conductive paste for an internal electrode, in which an average size of a nickel particle is 0.05 to 0.2 µm was prepared.

The conductive paste for an internal electrode was applied to each ceramic green sheet by a screen printing method to thereby form internal electrodes and fifty ceramic green sheets were then laminated to thereby form a laminate.

Then, the laminate was compressed and cut to form a chip having a size of 2012 standard, and the chip was sintered at a temperature of 1050 to 1200° C. under a reducing atmosphere in which $H_2$ is 0.1% or less.

Next, second external electrodes were formed to include a glass having a content of 20, 35, 70, 100, 200, and 250 parts by weight, respectively, with respect to a copper (Cu) metal and a plating process, or the like, was performed thereon to thereby manufacture the multilayer ceramic capacitors.

In the following Table 1, connectivity between the ceramic body and the external electrodes, plating defect occurrence, chip adhesion defect occurrence, and reliability according to a content of glass with respect of the copper (Cu) metal in the external electrodes of the multilayer ceramic capacitors were compared with each other.

TABLE 1

|  | Content of Glass (Parts by Weight with respect to Cu Metal) | Connectivity Between Ceramic Body and External Electrodes | Plating Defect Occurrence | Chip Adhesion Defect Occurrence | Reliability (High Temperature IR) |
|---|---|---|---|---|---|
| Comparative Example 1 | 20 | 0/100 | 0/200 | 0/10000 | 3/40 |
| Inventive Example 1 | 35 | 0/100 | 0/200 | 0/10000 | 0/40 |
| Inventive Example 2 | 70 | 0/100 | 0/200 | 0/10000 | 0/40 |
| Inventive Example 3 | 100 | 0/100 | 0/200 | 0/10000 | 0/40 |
| Inventive Example 4 | 200 | 0/100 | 0/200 | 0/10000 | 0/40 |
| Comparative Example 2 | 250 | 0/100 | 0/200 | 484/10000 | 0/40 |

In the case of Comparative Example 1 in which the second external electrodes include a glass having a content of 20 parts by weight with respect to the copper (Cu) metal, it could be appreciated from Table 1 that a chip adhesion defect has occurred and a defect was present in a high temperature insulation resistance (IR) test.

Further, in the case of Comparative Example 2 in which the second external electrodes include a glass having a content of 250 parts by weight with respect to the copper (Cu) metal, it could be appreciated that a chip adhesion defect has occurred.

On the other hand, in the case of Inventive Examples 1 to 4 in which a numerical value range of the present invention is satisfied, it could be appreciated that good results were shown in all of the tests regarding connectivity between the ceramic body and the external electrodes, plating defect occurrence, chip adhesion defect occurrence, and reliability.

Figure 5A:
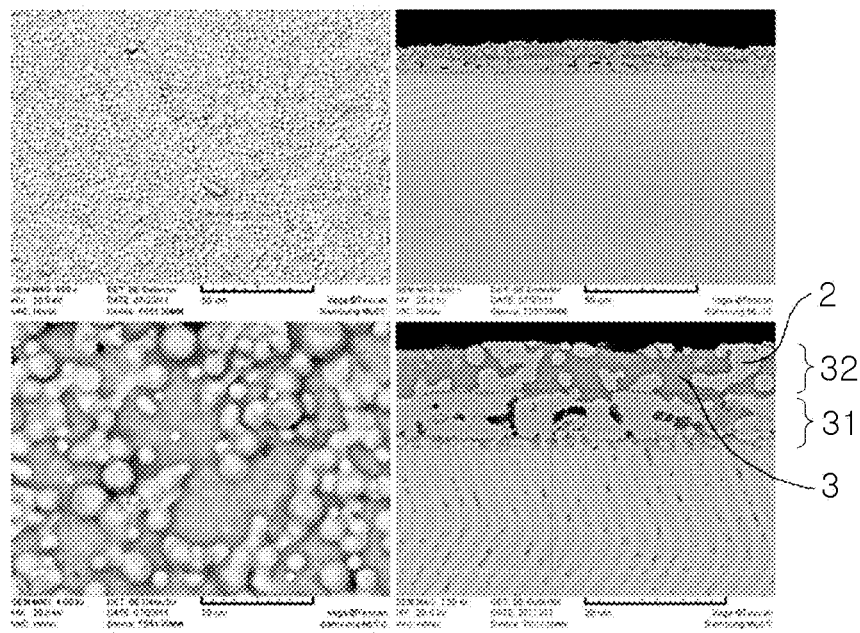
FIGS. 5A and 5B are scanning electron microscope (SEM) photographs showing cross sections of external electrodes of multilayer ceramic capacitors according to Inventive Example of the present invention and Comparative Example.
Figure 5B:
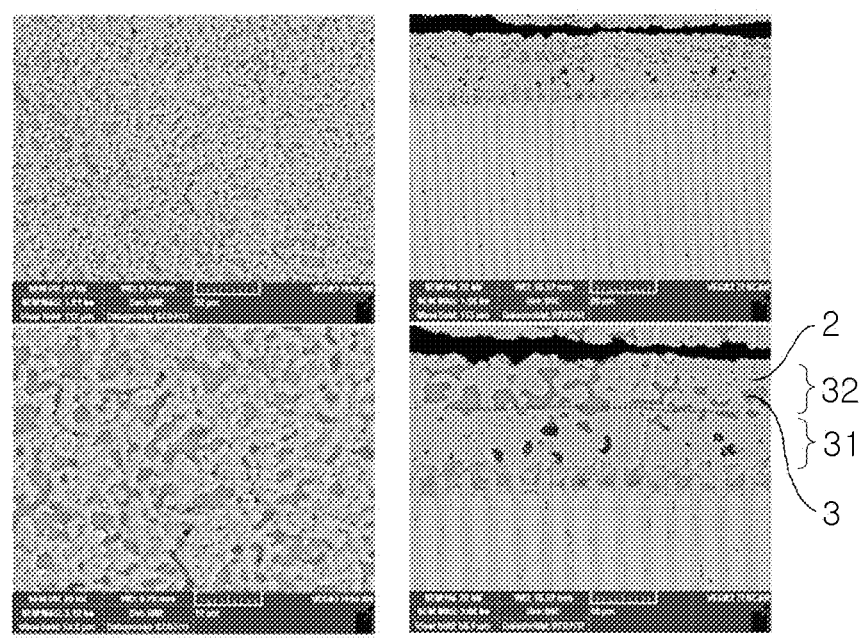

FIGS. 5A and 5B are scanning electron microscope (SEM) photographs showing cross sections of external electrodes of multilayer ceramic capacitors according to Inventive Example of the present invention and Comparative Example.

It could be appreciated from FIGS. 5A and 5B that the area of glass in the second external electrodes, in Inventive Example (See FIG. 5A) according to the embodiment of the present invention is significantly larger than that of the case in Comparative Example (See FIG. 5B).

As a result, according to the embodiment of the present invention, the second external electrodes include the conductive metal and the glass having the content of 35 to 200 parts by weight with respect to 100 parts by weight of the conductive metal, whereby the multilayer ceramic electronic component in which the connectivity between the ceramic body and the external electrodes is excellent, the plating defect and the chip adhesion defect do not occur, and the reliability is excellent may be implemented.

That is, according to the embodiments of the present invention, the sealing properties of the chip are improved, whereby the multilayer ceramic electronic component having improved reliability may be implemented.

As set forth above, according to the embodiments of the present invention, the external electrodes are formed of the paste for an external electrode, having an increased content of glass to improve the chip sealing properties, whereby the multilayer ceramic electronic component having improved reliability may be implemented.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component comprising:
a ceramic body including a dielectric layer;
first and second internal electrodes disposed within the ceramic body to face each other, while having the dielectric layer interposed therebetween; and
first external electrodes electrically connected to first and second internal electrodes and second external electrodes formed on the first external electrodes,
wherein the first and second external electrodes include a conductive metal and a glass, and when the second external electrodes are divided into three equal parts in a thickness direction, an area of the glass in central parts thereof with respect to an area of the central parts is 30 to 80%.

2. The multilayer ceramic electronic component of claim 1, wherein a ratio of a content of the glass in the first external electrodes to a content of the glass in the second external electrodes is 0.5 or less.

3. The multilayer ceramic electronic component of claim 1, wherein a ratio of an area of the glass in the first external electrodes to an area of the glass in the second external electrodes is 0.5 or less.

4. The multilayer ceramic electronic component of claim 1, wherein the second external electrodes have an average thickness of 5 μm or more.

5. The multilayer ceramic electronic component of claim 1, wherein the glass included in the second external electrodes is an insulating glass.

6. The multilayer ceramic electronic component of claim 1, wherein the conductive metal is at least one selected from a group consisting of copper (Cu), nickel (Ni), silver (Ag), and silver-palladium (Ag—Pd).

7. A multilayer ceramic electronic component comprising:
a ceramic body including a dielectric layer;
first and second internal electrodes disposed within the ceramic body to face each other, while having the dielectric layer interposed therebetween; and
first external electrodes electrically connected to first and second internal electrodes and second external electrodes formed on the first external electrodes,
wherein the first and second external electrodes include a conductive metal and a glass, and the second external electrodes include 35 to 200 parts by weight of the glass with respect to 100 parts by weight of the conductive metal.

8. The multilayer ceramic electronic component of claim 7, wherein a ratio of a content of the glass in the first external electrodes to a content of the glass in the second external electrodes is 0.5 or less.

9. The multilayer ceramic electronic component of claim 7, wherein a ratio of an area of the glass in the first external electrodes to an area of the glass in the second external electrodes is 0.5 or less.

10. The multilayer ceramic electronic component of claim 7, wherein the second external electrodes have an average thickness of 5 μm or more.

11. The multilayer ceramic electronic component of claim 7, wherein the glass included in the second external electrodes is an insulating glass.

12. The multilayer ceramic electronic component of claim 7, wherein the conductive metal is at least one selected from a group consisting of copper (Cu), nickel (Ni), silver (Ag), and silver-palladium (Ag—Pd).

13. The multilayer ceramic electronic component of claim 7, wherein when the second external electrodes are divided into three equal parts in a thickness direction, an area of the glass in central parts thereof with respect to an area of the central parts is 30 to 80%.

14. A conductive paste for an external electrode, the conductive paste comprising:
a conductive metal; and
a glass,
wherein the glass has a content of 35 to 200 parts by weight with respect to 100 parts by weight of the conductive metal.

15. The conductive paste of claim 14, wherein the glass is an insulating glass.

16. The conductive paste of claim 14, wherein the conductive metal is at least one selected from a group consisting of copper (Cu), nickel (Ni), silver (Ag), and silver-palladium (Ag—Pd).

17. A method of manufacturing a multilayer ceramic component, the method comprising:
preparing a ceramic body including a dielectric layer and first and second internal electrodes disposed to face each other, while having the dielectric layer interposed therebetween;
forming first external electrodes on end surfaces of the ceramic body so as to be electrically connected to the first and second internal electrodes;
preparing a conductive paste for an external electrode including a conductive metal and a glass having a content of 35 to 200 parts by weight with respect to 100 parts by weight of the conductive metal;
applying the conductive paste for an external electrode onto the first external electrodes; and
forming second external electrodes on the first external electrodes by sintering the ceramic body.

18. The method of claim 17, wherein when the second external electrodes are divided into three equal parts in a thickness direction, an area of the glass in central parts thereof with respect to an area of the central parts is 30 to 80%.

19. The method of claim 17, wherein a ratio of a content of the glass in the first external electrodes to a content of the glass in the second external electrodes is 0.5 or less.

20. The method of claim 17, wherein a ratio of an area of the glass in the first external electrodes to an area of the glass in the second external electrodes is 0.5 or less.

21. The method of claim 17, wherein the second external electrodes have an average thickness of 5 μm or more.

22. The method of claim 17, wherein the glass included in the second external electrodes is an insulating glass.

23. The method of claim 17, wherein the conductive metal is at least one selected from a group consisting of copper (Cu), nickel (Ni), silver (Ag), and silver-palladium (Ag—Pd).

24. The method of claim 17, wherein the sintering of the ceramic body is performed at a temperature of 750° C. or less.

* * * * *